United States Patent
Liao

[19]

[11] Patent Number: 6,145,227
[45] Date of Patent: Nov. 14, 2000

[54] FLUID DECORATION STRUCTURE

[76] Inventor: Chu-Yuan Liao, 5F-1, No. 177, Sec. 1 Ho-Ping E. Rd., Taipei, Taiwan

[21] Appl. No.: 09/478,997

[22] Filed: Jan. 7, 2000

[51] Int. Cl.⁷ .................................................... G09F 19/00
[52] U.S. Cl. .............................. 40/406; 40/429; 446/220
[58] Field of Search .............................. 40/406, 409, 539, 40/736; 446/220

[56] References Cited

U.S. PATENT DOCUMENTS

| | | | |
|---|---|---|---|
| 2,361,423 | 10/1944 | Snyder | 40/406 |
| 2,383,390 | 8/1945 | Jacobs | 446/220 |
| 4,811,841 | 3/1989 | Domenichiello | 446/220 |
| 5,119,281 | 6/1992 | Akman | 446/220 |
| 5,967,088 | 10/1999 | Lin | 40/406 |

FOREIGN PATENT DOCUMENTS 6274115  9/1994  Japan ....................... 40/406

*Primary Examiner*—Cassandra H. Davis
*Attorney, Agent, or Firm*—Dougherty & Troxell

[57] ABSTRACT

Fluid decoration structure including a collar, a partitioning board, a base seat, a soft transparent film-like enclosing body, a fluid and multiple decorative articles. The fluid, decorative articles and partitioning board are enclosed in the enclosing body. The partitioning board is formed with at least one through hole. The collar is downward fitted from upper side of the enclosing body to the partitioning board. The collar is formed with an annular neck section for pressing the partitioning board in a receiving/locating space defined between the collar and the base seat. Also, an open end of the enclosing body is fixedly clamped in the receiving/locating space. The bound section of the open end of the enclosing body hidden between the partitioning board and the base seat. The base seat and the collar are tightly connected with each other so that no sealing track is revealed outside. The transparent enclosing body form a soft body on the base seat to naturally present the decorative articles enclosed therein. In addition, along with the flowing and variation of the fluid contained in the enclosing body, a special visual effect is achieved. Moreover, the enclosing body is made of soft material so that a user can indirectly touch the decorative articles enclosed therein to enhance the entertaining effect.

16 Claims, 3 Drawing Sheets

FLUID DECORATION STRUCTURE

BACKGROUND OF THE INVENTION

The present invention relates to a fluid decoration structure, and more particularly to a fluid decoration structure in which a fluid, several decorative articles and a partitioning board are enclosed in a soft enclosing body and then open end of the enclosing body is sealed. A collar is used to press the partitioning board in a receiving/locating space defined between the collar and a base seat which is connected with the collar to clamp the partitioning board. Therefore, the sealed section of the open end of the enclosing body is hidden between the partitioning board and the base seat. Through the soft enclosing body, a user can indirectly touch the decorative articles enclosed therein to achieve both visual and touching or playing entertaining effects.

A conventional fluid decoration includes a hard transparent or glass-made housing for containing therein a fluid and several decorative articles. Such fluid decoration is rested on a certain place for watching and it is impossible to a user to further directly or indirectly touch and play the contents of the fluid decoration. For example, a crystal ball decoration includes a glass-made or similar transparent housing in which a flowing article or a fluid is filled. Through the transparent or semitransparent housing, a user can watch the flowing fluid and the decorative articles entrained by the fluid. However, such decoration is made of hard material such as glass so that a user can hardly touch and play the decorative articles contained therein. In addition, once the hard decoration is incautiously dropped and broken, the fluid and the glass chips as well as the decorative articles will spread over the ground.

SUMMARY OF THE INVENTION

It is therefore a primary object of the present invention to provide a fluid decoration structure which can achieve both watching and squeezing or playing entertaining effects. The fluid decoration includes a collar, a partitioning board, a base seat, a soft transparent film-like enclosing body, a fluid and multiple decorative articles. The fluid, decorative articles and partitioning board are enclosed in the enclosing body. The collar is downward fitted from upper side of the enclosing body to the partitioning board. The collar is formed with an annular neck section for pressing the partitioning board in a receiving/locating space defined between the collar and the base seat. Also, an open end of the enclosing body is fixedly clamped in the receiving/locating space. The sealed section of the open end of the enclosing body hidden between the partitioning board and the base seat. The fluid is filled in the enclosing body to support the same at a certain height to provide a certain softness and resilience. The enclosing body is made of soft material so that a user not only can watch the flowing fluid and the decorative articles, but also can indirectly softly touch the decorative articles enclosed therein to enhance the entertaining effect. Also, in case the decoration is incautiously dropped, the soft enclosing body can provide a buffering effect.

The present invention can be best understood through the following description and accompanying drawings wherein:

DETAILED DESCRIPTION OF THE PREFERRED EMBODIMENT

Figure 1:
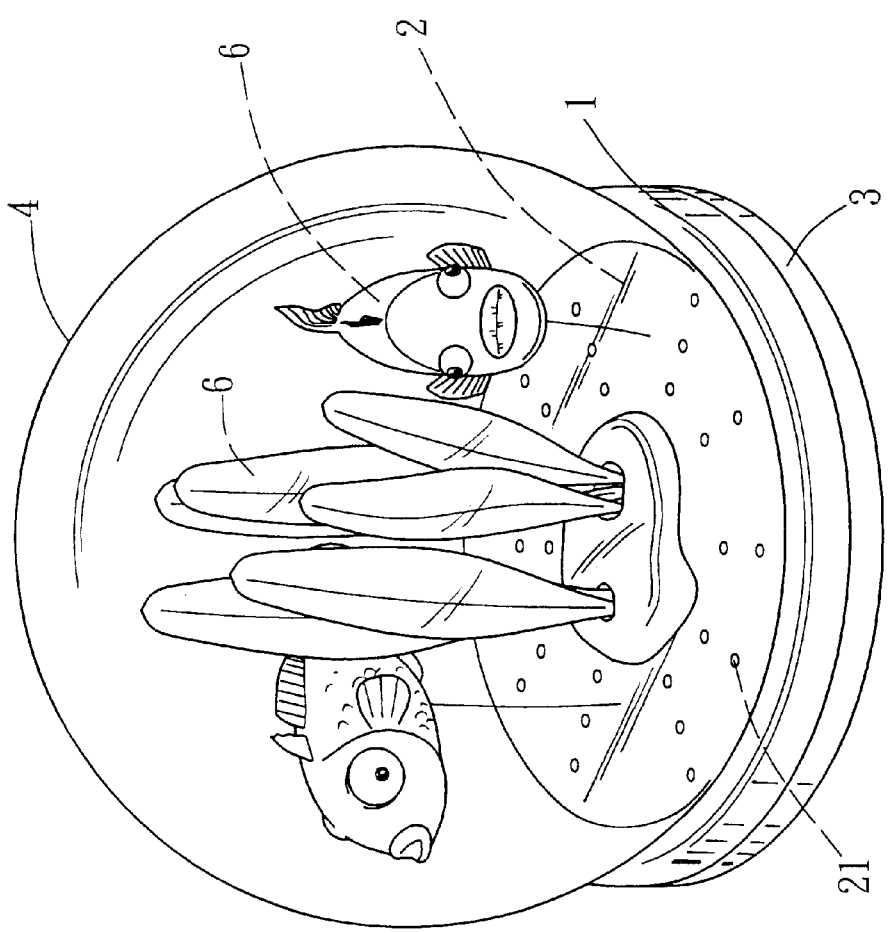
FIG. 1 is a perspective view of the present invention.
Figure 3:
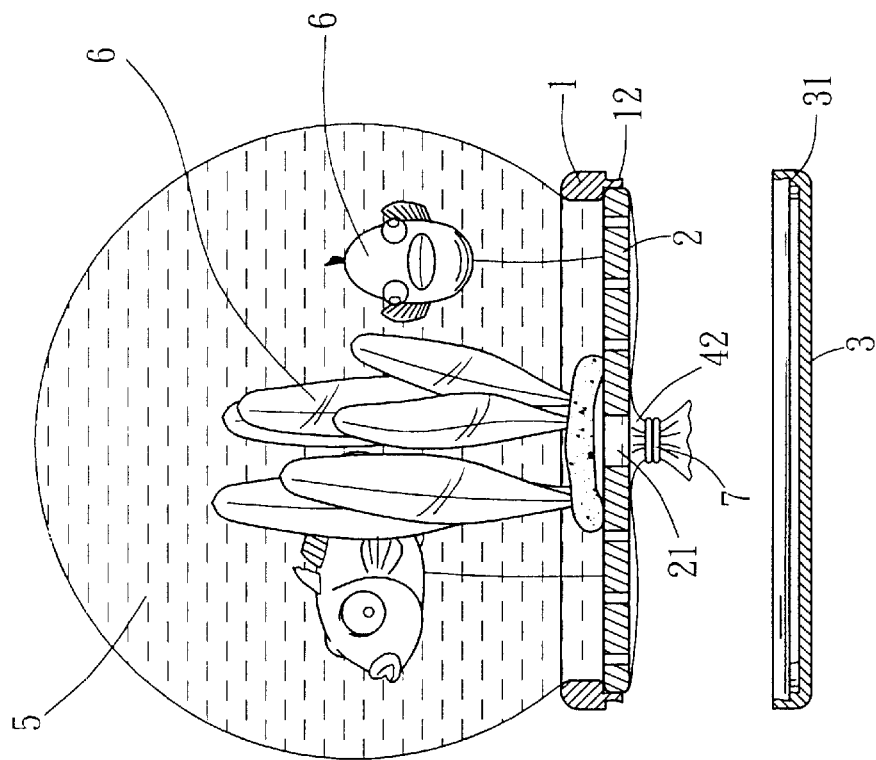
FIG. 3 is a sectional partially exploded view of the present invention in which the liquid is filled into the enclosing body.
Figure 2:
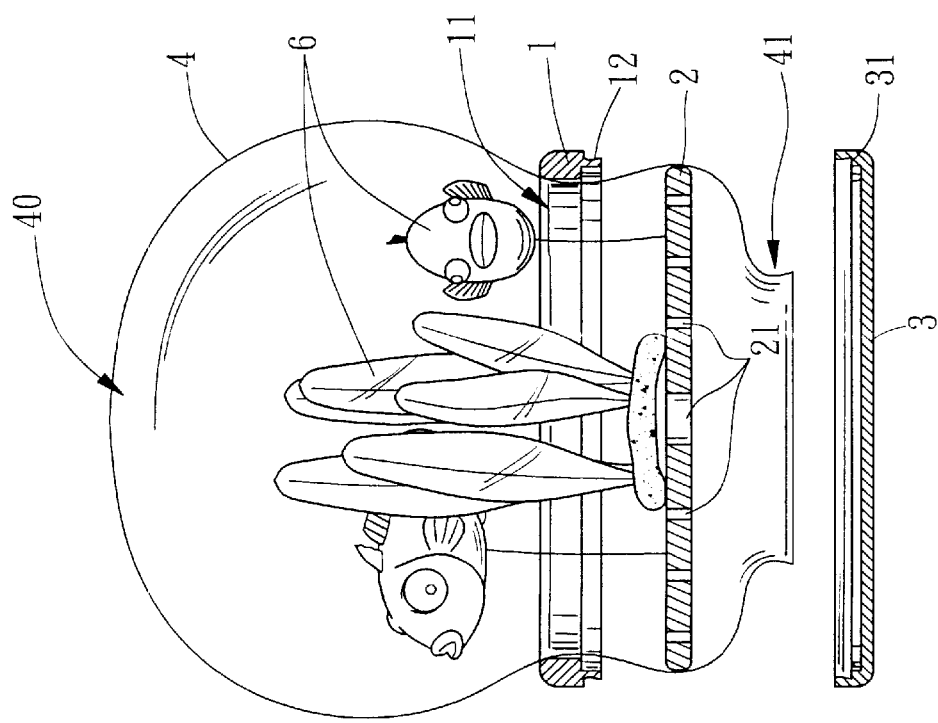
FIG. 2 is a sectional exploded view of the present invention in which the liquid is not yet filled into the enclosing body.
Figure 4:
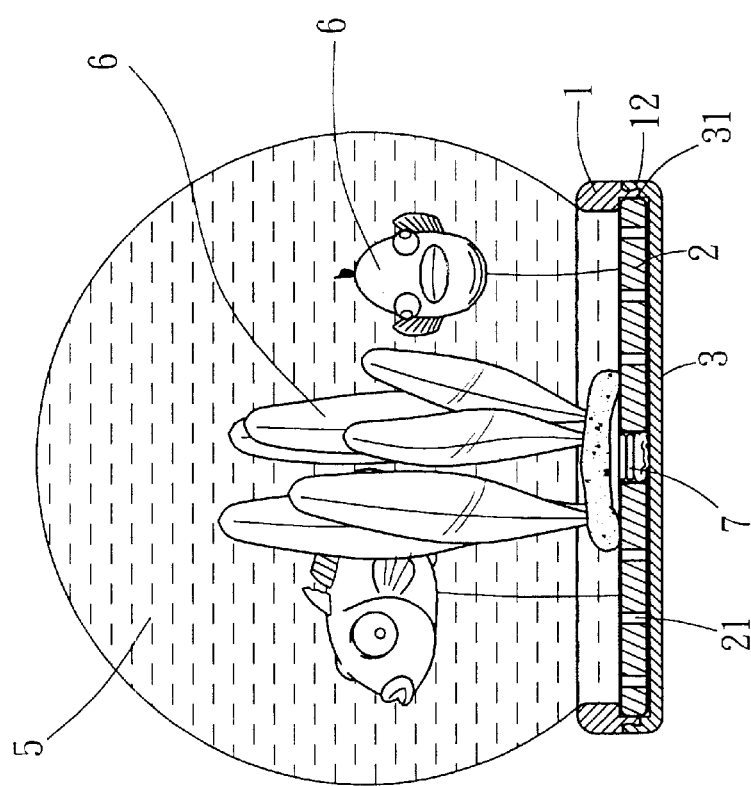
FIG. 4 is a sectional assembled view of the present invention.

Please refer to FIGS. 1 to 4. The fluid decoration structure of the present invention includes a collar 1, a partitioning board 2, a base seat 3, a soft film-like enclosing body 4, a fluid 5 and multiple decorative articles 6. The fluid 5, decorative articles 6 and partitioning board 2 are enclosed in the enclosing body 4. The decorative articles 6 can be connected to the partitioning board 2 by strings or adhered to the partiioning board 2. The enclosing body 4 has a close end 40 and an open end 41. After the partioning board 2 is enclosed, the open end 41 is collected between the partitioning board 2 and the base seat 3 and bound or sealed by a sealing material 42. The partitioning board 2 is previously formed with at least one through hole 21. The collar 1 is formed with a central hole 11 and fitted around the enclosing body 4 immediately above the partitioning board 2. The collar 1 presses the partitioning board 2 in a receiving/locating space defined between the collar 1 and the base seat 3, whereby the enclosing body 4 is fixedly clamped in the space 13. The bound section 42 of the open end of the enclosing body 4 can be sealed under the partitioning board 2 by a tying cord member or binding member 7 or adhesive material. By means of connecting the base seat 3 with the collar 1, the bound section 42 is totally reliably located and hidden. Therefore, no sealing track is revealed outside. The connection between the collar 1 and the base seat 3 can be achieved by insertion latch structures 12, 31 and enhanced by adhesive glue.

The above embodiment is only used to illustrate the present invention, not intended to limit the scope thereof. Many modifications of the above embodiment can be made without departing from the spirit of the present invention.

What is claimed is:

1. Fluid decoration structure comprising a collar, a partitioning board, a base seat and a soft transparent film enclosing body, a fluid and multiple decorative articles, the fluid, decorative articles and partitioning board being enclosed in the enclosing body, the enclosing body having a close end and an open end, the collar being formed with a central hole and downward fitted around the enclosing body immediately above the partitioning board, near the open end, the collar pressing the partitioning board in a receiving/locating space defined between the collar and the base seat, the fluid and the decorative articles being left between the partitioning board and the close end, the open end of the enclosing body being collected and sealed between the partitioning board and the base seat, the base seat being firmly connected with the collar, whereby the sealed open end of the enclosing body and the partitioning board are fixedly clamped in the space between the collar and the base seat.

2. Fluid decoration structure as claimed in claim 1, wherein the decorative articles are connected to the partitioning board by strings.

3. Fluid decoration structure as claimed in claim 2, wherein the partitioning board is formed with several vertical through holes.

4. Fluid decoration structure as claimed in claim 3, wherein the partitioning board is formed with several vertical through holes.

5. Fluid decoration structure as claimed in claim 4, wherein the partitioning board is formed with several vertical through holes.

6. Fluid decoration structure as claimed in claim 5, wherein the partitioning board is formed with several vertical through holes.

7. Fluid decoration structure as claimed in claim 6, wherein the partitioning board is formed with several vertical through hole.

8. Fluid decoration structure as claimed in claim 7, wherein the partitioning board is formed with several vertical through holes.

9. Fluid decoration structure as claimed in claim 8, wherein the partitioning board is formed with several vertical through holes.

10. Fluid decoration structure as claimed in claim 1, wherein the decorative articles are adhered to the partitioning board by an adhesive.

11. Fluid decoration structure as claimed in claim 1, wherein the open end of the enclosing body is sealed by a tying cord member.

12. Fluid decoration structure as claimed in claim 1, wherein the open end of the enclosing body is sealed by a binding member.

13. Fluid decoration structure as claimed in claim 1, wherein the open end of the enclosing body is sealed by an adhesive material.

14. Fluid decoration structure as claimed in claim 1, wherein the collar and the base seat are latched with each other by insertion latch structure.

15. Fluid decoration structure as claimed in claim 1, wherein the collar and the base seat are connected with each other by adhesive material.

16. Fluid decoration structure as claimed in claim 1, wherein the partitioning board is formed with several vertical through holes.

* * * * *